United States Patent [19]

Chrisman

[11] 4,277,274
[45] Jul. 7, 1981

[54] PROCESS FOR CONTROLLING MOLTEN GLASS VARIABLES

[75] Inventor: Max G. Chrisman, Granville, Ohio

[73] Assignee: Owens-Corning Fiberglas Corporation, Toledo, Ohio

[21] Appl. No.: 864,559

[22] Filed: Dec. 27, 1977

[51] Int. Cl.³ .............................................. C03B 5/24
[52] U.S. Cl. ........................................ 65/29; 65/134; 65/160; 65/178
[58] Field of Search ................... 65/134, 135, 136, 29, 65/160, 178

[56] References Cited

U.S. PATENT DOCUMENTS

| 2,679,749 | 6/1954 | Poole | 65/134 X |
| 3,278,844 | 10/1966 | Bell et al. | 324/65 |
| 3,476,538 | 11/1969 | Trethewey | 65/29 |

*Primary Examiner*—Arthur D. Kellogg
*Attorney, Agent, or Firm*—Ronald C. Hudgens; Charles F. Schroeder; William P. Hickey

[57] ABSTRACT

A process for controlling the composition, viscosity, resistivity or other variables of a molten glass by sensing temperature and resistivity or viscosity and making corrections in accordance with the deviation of the sensed properties and desired properties of the glass, as for example, a desired viscosity and/or composition.

6 Claims, 6 Drawing Figures

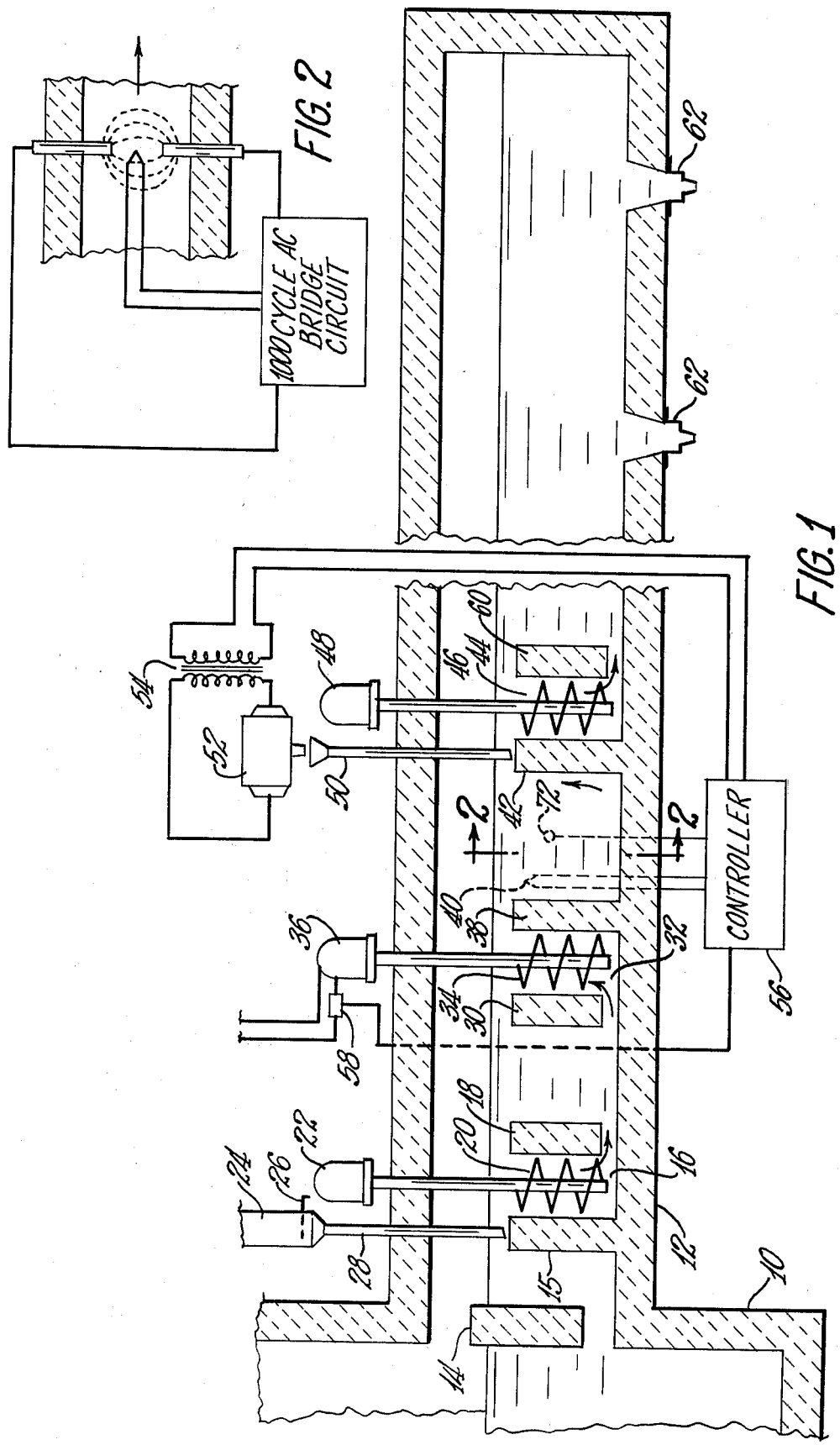

PROCESS FOR CONTROLLING MOLTEN GLASS VARIABLES

The present invention relates to a new and improved system for controlling the operation of a glass furnace.

BACKGROUND OF THE INVENTION

As far as I am aware, there is no automatic instrumentation for controlling either the viscosity or the composition of glass produced in a glass furnace. Presently the operation of a glass furnace depends much upon the experience of the operator, and is truly an art. The analysis of the glass being produced in a furnace can only be had after the fact, so to speak, by taking samples to a laboratory and running an analysis thereon. Operators from experience, however, by observing temperatures and other characteristics of the furnace, can tell to some degree when the composition has gotten off, so to speak; and in many instances know what to do or what to add in order to bring the composition back into specification. In order to do this, the operator will observe the glass in the forehearth, the manner in which it is flowing, any froth on top of the molten glass, etc., and will then make certain changes which he has learned to do from past experience.

An object of the present invention, therefore, is the provision of a new and improved system whereby automatic instrumentation can be used to regulate either the composition or the viscosity of the glass being produced and cause it to have the desired physical properties and/or chemical composition that is desired.

Further objects and advantages of the invention will become apparent to those skilled in the art to which the invention relates from the following description of several preferred embodiments described with reference to the accompanying drawings forming a part of this specification.

BRIEF DESCRIPTION OF THE DRAWINGS

FIG. 1 is schematic view in elevation showing the end of a furnace, the forehearth glass mixing apparatus, and controls for automatically producing a glass of the desired characteristic;

FIG. 2 is a fragementary plan view of a section of the forehearth shown in FIG. 1 and showing temperature and resistance sensing elements;

DESCRIPTION OF THE PREFERRED EMBODIMENTS

Figure 3:
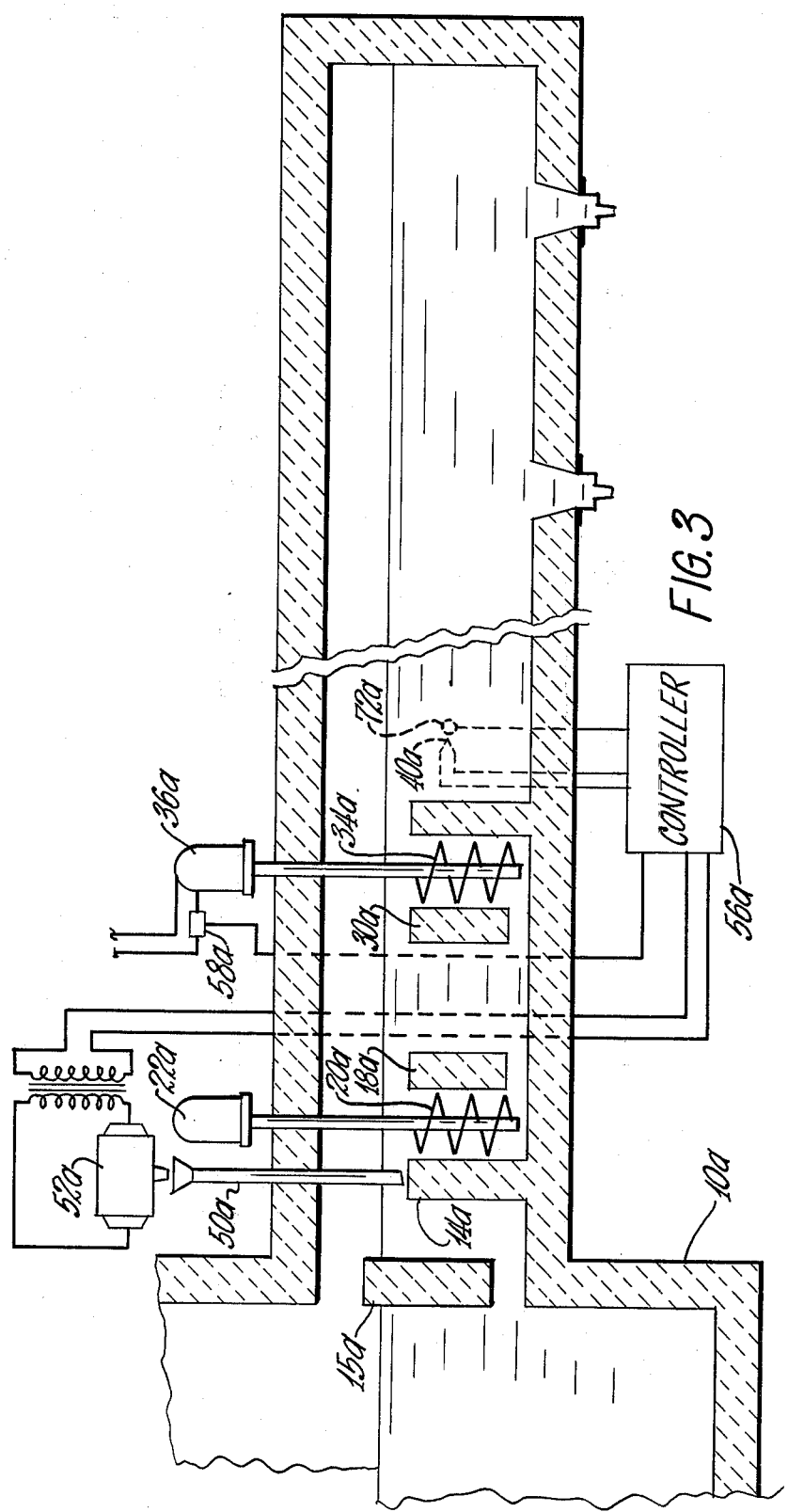
FIG. 3 is another embodiment, similar to FIG. 1, but showing a more simplified version of the invention.

According to principles of the present invention, resistivity of molten glass is sensed by a controller which compares the sensed resistivity with the resistivity of a desired glass, and which uses the difference therebetween to control the viscosity of the glass or the composition of the glass, or both.

According to further principles of the present invention, a glass furnace is operated by charging a main batch that is purposely deficient in one or more materials to the glass furnace. Another additive batch is prepared of a composition which theoretically, when added to glass produced in the glass furnace, will give the desired composition. The additive batch is added to the molten main batch and the two materials are mixed adjacent the exit of the glass furnace, or in the forehearth, to produce the finished glass composition. Electrical conductivity or viscosity of the mixture of the two materials is sensed and is compared by a controller to that of a desired composition at the temperature of the mixed materials. The deviation of the sensed property to the property of the desired glass is then used to regulate a flow of the additive material to give the desired composition. The ingredients of the additive material may be one or more of the materials forming the desired glass batch composition, and the additive material may be added either as a solid or as a molten glass. Advantages are had by putting a large portion of the low melting or volatile materials of the desired glass batch composition in the additive material, to avoid losses of these materials in the glass furnace, and to also facilitate the mixing of the two materials. Mechanical problems exist in trying to control the flow of molten glasses by means of valves, etc; and according to a further principle of the invention, the control of the additive material is had by controlling the temperature of the additive glass immediately upstream of a fixed platinum orifice.

EXAMPLE 1

A glass batch designed to produce E glass for making glass fibers was divided into a main batch and an additive batch which had the following compositions in percent by weight:

| Main Batch | Additive Batch |
|---|---|
| $SiO_2$ - 62.0 | $SiO_2$ - 8.0 |
| $Al_2O_3$ - 17.0 | $B_2O_3$ - 47.0 |
| CaO - 21.0 | $F_2$ - 5.0 |
| | $Na_2O$ - 3.5 |
| | CaO - 33.0 |
| | Impurity - 3.5 |

The main batch is added to a glass furnace indicated generally by numeral 10 in FIG. 1 and the materials are melted. In the embodiment shown in FIG. 1, the molten main glass flows into the forehearth 12 and under a skimming weir 14 down through a mixing chamber 16 and underneath a recirculating weir 18. A helical mixer 20 is positioned in the mixing chamber 16. Mixer 20 is driven by an electrical motor 22. In the embodiment shown in FIG. 1, approximately 75% of the required additive material is added as a solid from a hopper 24 through a suitable manually regulated means 26. This stream of additive material flows through tube 28 to beneath the surface of the glass flowing over weir 15. The granulated material is immediately melted by the molten main glass in the mixing chamber 16. Some of the molten mixture recirculates back over the top of the recirculating weir 18 with part of the mixture flowing beneath another recirculating weir 30 to a second mixing chamber 32. A second helical mixer 34 driven by an electrical motor 36 is positioned therein. The electrical motor 36 drives the mixer in a direction to pump the molten glass upwardly and over the recirculating weir 30 with some of the molten glass proceeding over the top of an overflow weir 38. A thermocouple 40 is positioned adjacent the top of the weir 38 to sense the temperature of the glass at this point. The glass at this point will hereafter be called an intermediate glass, and its composition is slightly deficient in the additive materials required to make the desired E glass.

The intermediate glass flows over the top of an overflow weir 42 to a third mixing chamber 44 containing a third helical mixer 46 that is driven by an electrical motor 48. Before the intermediate glass enters the mixing chamber 44, a small molten stream of the additive glass is added through the tube 50 to beneath the surface of the intermediate glass. In this case, the additive glass is first melted in an electrical melter 52, which, of course, is of very small size. The glass exits the melter 52 through a fixed orifice in a platinum bushing in the bottom thereof. The amount of additive glass exiting from the fixed orifice is controlled by the temperature of the additive glass within the melter by regulating the power supply to the melter. Power is supplied from a transformer 54 and its supply is regulated by a controller 56 which receives a temperature input signal from the thermocouple 40.

Figure 5:
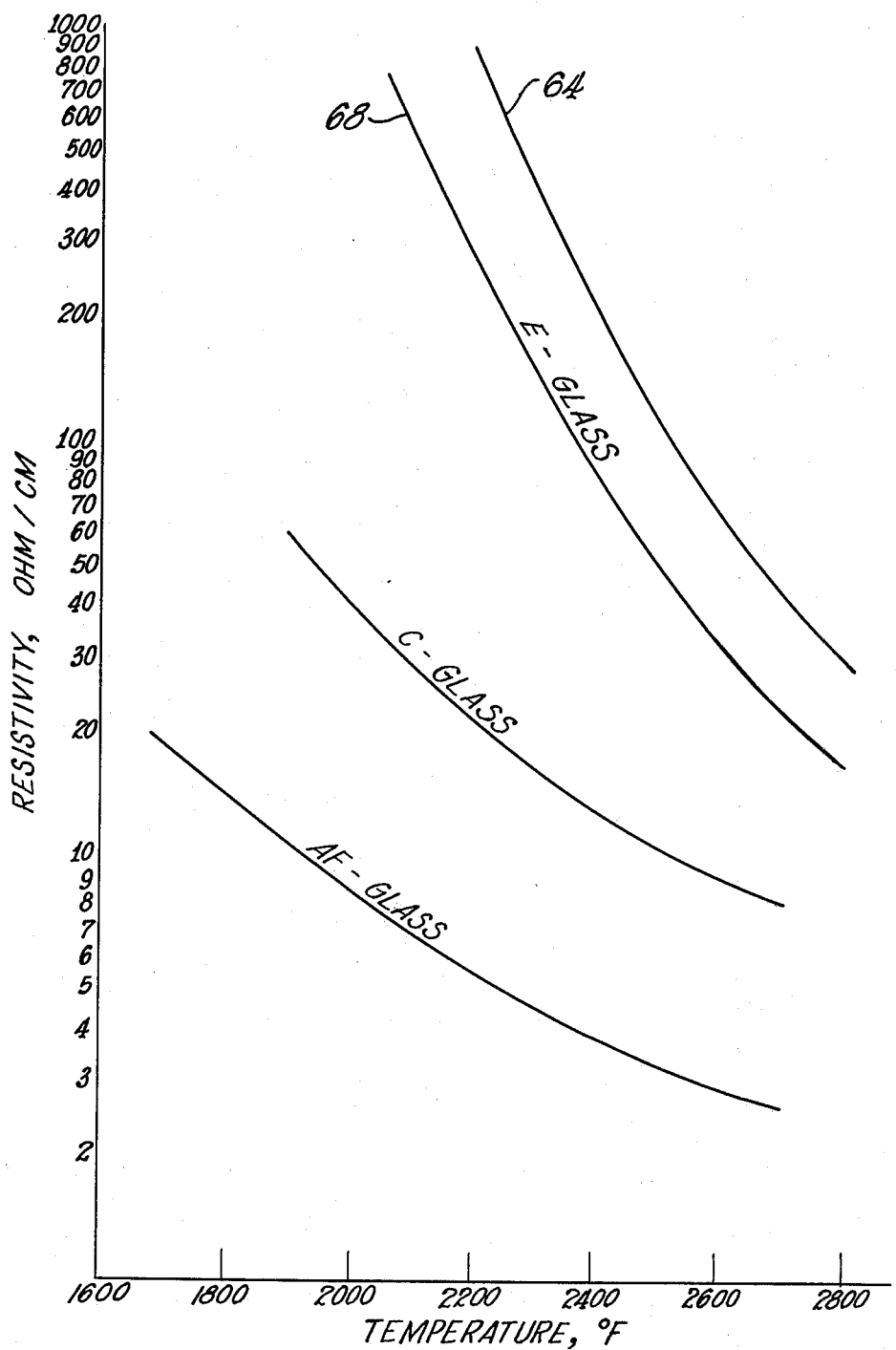
FIG. 5 is a graph of electrical resistivity versus temperature for glasses of various compositions.
Figure 6:
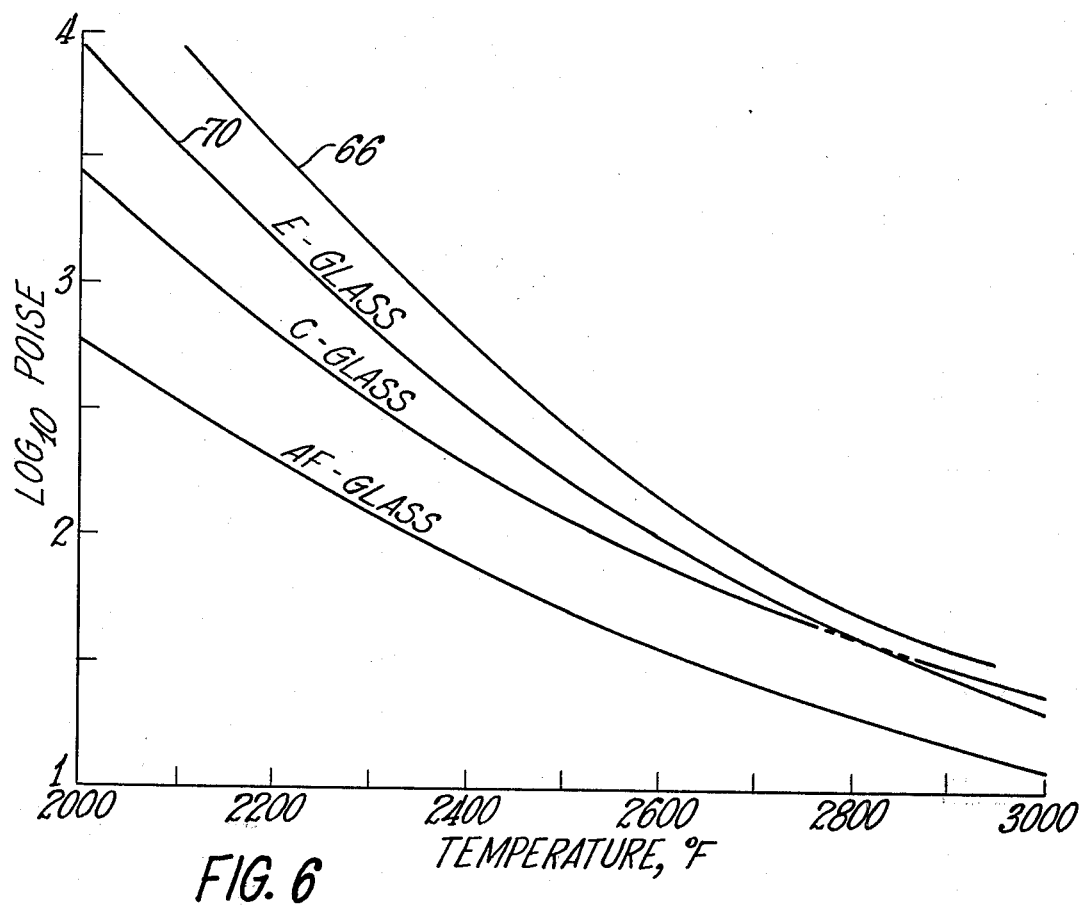
FIG. 6 is a graph of viscosity versus temperature for a number of glasses of different composition.

It has been determined that the viscosity of glasses will vary with composition at any given temperature and that therefore, the viscosity-temperature curve of one glass composition may significantly differ from that of another glass composition. This is particularly true when the glasses vary in what is considered to be fluxing ingredients, such as $Na_2O$, $B_2O_3$, sodium fluorides, sodium sulfates, lead oxides, etc. This phenomenon is used in the present instance by measuring the power supplied to the fixed RPM motor 36 by a power sensor 58. The power sensor sends a signal to the controller that is a function of the viscosity of the intermediate glass. The controller 56 compares the viscosity of the intermediate glass with that of the desired glass at the temperature sensed by the thermocouple 40, and in turn regulates the amount of power that is supplied to the electrical bushing 52. The viscosity of the molten glass decreases with temperature, and this increases the flow through the orifice in the bottom of the melter 52. The molten glass flows through the tube 50 and is added to the intermediate glass to bring its composition up to that of the desired finished glass. This mixture is recirculated around a recirculating weir 60 with part of the flow proceeding down the forehearth to the bushing 62 where it is delivered to textile fiber producing machinery. Other suitable means can be utilized to sense the viscosity of the glasses being mixed, as for example, by means of a strain gauge on the shaft of the mixer 34. Instead of viscosity, resistivity of the glass may be used as an indication of composition, since it, too, has been determined to be a usable indication of the glass composition. FIG. 5 is a suitable chart of resistivity versus temperature for various glasses; and FIG. 6 is a suitable chart of the viscosity versus temperature for the same glasses. In the present instance, the main glass has a resistivity curve indicated at 64 and a viscosity curve indicated at 66. The resistivity curve of the desired E glass is indicated at 68, and the viscosity curve of the desired E glass is indicated at 70.

In the process shown in FIG. 1, the resistivity is sensed by structure shown schematically in FIG. 2 wherein a pair of electrodes are spaced from two or four inches apart at the discharge of the weir 38. Alternating current of approximately 1,000 cycles per second is passed between the electrodes through the molten glass. It has been determined that DC current should not be used, since it can give erroneous readings. The controller 56, of course, used this information instead of the viscosity information supplied by the power sensor 58 and compares the resistance of the intermediate glass with that of the E glass at the temperature being sensed. The deviation of this resistivity from that of E glass is determined, and the flow of electricity to the electric melter 52 is varied accordingly. The final composition of the resulting glass will be very close to that of the desired E glass composition, since the additive is added in two stages, and the controlled stage only regulates a portion of the total quantity of additive which is theoretically required. The operator of this furnace, of course, will adjust the mechanism 26 on the low side.

A less expensive arrangement of the present invention is shown in FIG. 3 of the drawings. Those portions of the embodiment shown in FIG. 3 which correspond to similar portions of the embodiment shown in FIG. 1 are designated by a like reference numeral characterized further in that a subscript "a" is affixed thereto.

The embodiment shown in FIG. 3 differs from the embodiment shown in FIG. 1 principally in that all of the additive is molten and is added in a single stage, rather than in two stages as was done in the embodiment of FIG. 1. The embodiment shown in FIG. 3 uses the viscosity of the glass as determined from the amount of power supplied to the motor 36a as a criterion of the composition of the finished glass. This signal plus the temperature signal from the thermocouple 40a causes the controller to in turn regulate the power supply to the electric melter 52a to control the entire amount of the additive glass, a resistivity signal from the electrodes 72a can be utilized to derive a composition signal instead of the viscosity signal derived by the power sensor 58a.

EXAMPLE 2

A glass batch for producing a wool glass product was divided into a main batch and an additive batch which had the following compositions in percent by weight:

| Main Batch | Additive Batch |
|---|---|
| $SiO_2$ - 63.4 | $SiO_2$ - 60.2 |
| $Al_2O_3$ - 16.0 | $B_2O_3$ - 8.0 |
| CaO - 19.0 | $Na_2O$ - 19.3 |
| $TiO_2$ - 0.6 | CaO - 4.2 |
| | MgO - 4.0 |
| | $Fe_2O_3$ - 0.3 |
| | BaO - 3.1 |
| | $SO_3$ - 0.5 |

The main batch was melted in the glass furnace 10 of FIG. 1 and the additive batch was added in the same manner as given in Example 1 above. The finished glass that is produced is well within manufacturing tolerance of the desired composition.

EXAMPLE 3

A soda line glass batch is divided into a main batch and an additive batch having the following compositions in percent by weight:

| Main Batch | Additive Batch |
|---|---|
| $SiO_2$ - 61.6 | $SiO_2$ - 72.7 |
| $Al_2O_3$ - 0.4 | $Al_2O_3$ - 1.6 |
| CaO - 29.7 | CaO - 3.9 |

| Main Batch | Additive Batch |
|---|---|
| MgO - 7.9 | MgO - 2.7 |
| $Fe_2O_3$ - 0.3 | $Na_2O$ - 18.3 |
| | $K_2O$ - 0.3 |
| | $Fe_2O_3$ - 0.4 |

The main batch is melted in the glass furnace 10a of FIG. 3. The additive glass batch is melted in the melter 52a and the flow therefrom is controlled by regulating the temperature of the additive glass passing through its fixed orifice. The controller 56a is arranged to sense the resistivity of the molten glass through electrode 72a and in turn control the temperature of the bushing in the melter 52a. The glass produced is well within commercial tolerance.

EXAMPLE 4

Figure 4:
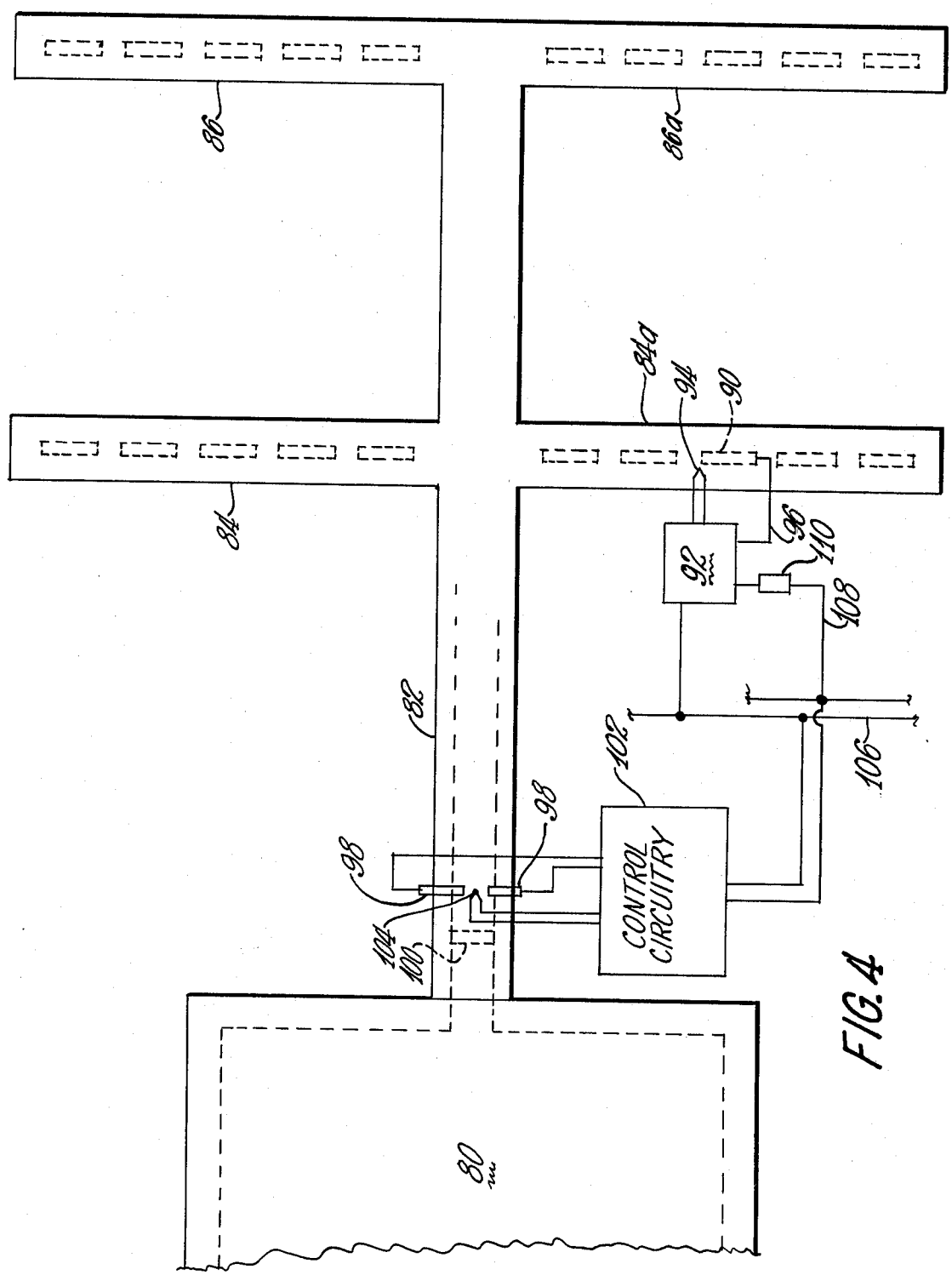
FIG. 4 is a schematic view of a glass furnace and forehearth for feeding textile bushings; and showing a controller for controlling the viscosity of the molten glass at the various bushings.

FIG. 4 of the drawings shows a conventional glass furnace and forehearth arrangement for supplying molten glass to a plurality of textile bushings. The arrangement includes a glass furnace 80 for melting E glass and a forehearth 82 leading therefrom to laterals 84, 84a, 86, and 86a. A plurality of platinum bushings 90 are mounted in the bottom of the forehearth and laterals, and conventionally additional heat is supplied at each bushing by an electrical controller 92—one for each bushing. A thermocouple 94 is positioned above each bushing to sense the temperature of molten glass as it enters the bushing and the controller 92 utilizes this signal to control the flow of electrical energy to the resistance heating portion of the bushing through line 96. Conventionally an operator manually sets the "set point" of controller 92 to provide a predetermined temperature of the glass in the bushing 90. Periodically the operator may change the set point of the controller 92 to adjust for a change in viscosity of the molten glass coming out of the bushing, as may result from a change in composition for example.

According to the present invention, an automatic system is provided for maintaining the viscosity of the glass coming out of the bushing to within acceptable limits for fiber forming. A pair of electrodes 98 project through the sidewalls of the forehearth 82 to within two to six inches from each other are immersed in the molten glass passing the skimmer weir 100. A controller 102 measures the voltage drop of an alternating current between the electrodes to thereby sense the resistivity of the molten glass. A thermocouple 104 is placed in the stream of glass passing the electrodes 98, and the thermocouple 104 is connected to the controller 102 so that it also senses temperature. The controller 102 is constructed and arranged to compare the resistivity of the molten glass at the measured temperature with the resistivity of a glass which has the desired viscosity at that temperature and then puts out an output signal that is proportional to the difference. This output signal can be used in various ways, but is shown in the drawing as passing through the signal loop 106 to each of the controllers 92, one for each bushing. The signal from the loop passes through branch line 108 to a time delay device 110 which is set to give a singal delay corresponding to the time it takes for molten glass to reach the bushing involved. The signal from the delay device 110 is used to adjust the "reset" or "control point" of the controller 92 so that they, in turn, will change the temperature of the molten glass in the bushing to give the desired glass viscosity for forming fibers. Alternatively, more than one controller 102 can be used, and in the most exacting system, there would be one controller 102 and electrodes 98 at each bushing. It will further be understood that the signal loop lines 106 could go to a computer which would, in turn, perform the function of the controller 92 for each bushing.

While the system of the present invention will have particular advantages in the manufacture of continuous strand textile, staple, or blown insulation fiber, the invention is not so limited and can be used for the manufacture of plate glass, bottle glass, etc.

While the invention has been described in considerable detail, I do not wish to be limited to the particular embodiments shown and described; and it is my intention to cover all novel adaptations, modifications and arrangements thereof which come within the practice of those skilled in the art to which the invention relates.

I claim:

1. An accurate method of making a desired glass composition comprising: preparing a molten host glass that is purposefully deficient in one or more elements by a generally predetermined amount; preparing an additive that contains the deficient amount of said element; adding a first stream comprising a major amount of the additive at a predetermined rate to a stream of the molten host glass; mixing the additive and host glass to form an intermediate glass; sensing the temperature and the viscosity or resistivity of the intermediate glass; adding a second stream comprising the balance of the aditive to the intermediate glass; mixing the second stream of additive and intermediate glass to form a finished glass; and controlling the flow of the second stream of additive in response to said sensed viscosity or resistivity at said sensed temperature to accurately control the composition of the finished glass.

2. The method of claim 1 wherein said second stream of additive is controlled in response to resistivity.

3. The method of claim 1 wherein said second stream of additive is controlled in response to the viscosity of said intermediate glass.

4. The method of claim 3 wherein said second stream of additive is controlled in response to the power required for mixing the second stream of additive and intermediate glass.

5. An accurate method of making a desired glass composition comprising: preparing a molten host glass that is purposefully deficient in one or more elements by a generally predetermined amount; adding a first stream of a major portion of said predetermined amount of said element at a predetermined rate to a stream of the molten host glass; mixing said first stream and host glass to form an intermediate glass; sensing the temperature and viscosity or resistivity of the intermediate glass; flowing a second molten stream of said deficient element or elements through an orifice into the intermediate glass; mixing the second stream and intermediate glasses to form a finished glass; and controlling the temperature of the additive glass flowing through said orifice in response to the difference between said sensed viscosity or resistivity and that of the desired glass at said sensed temperature.

6. A method of making a glass of a desired compositon, said method comprising the steps of: preparing a molten host glass; preparing a molten additive glass; flowing said host and additive glasses together; mixing said glasses by means of a mixer driven by a rotating shaft; sensing the torque in said shaft; sensing the temperature of said host glass or mixed glass; providing a signal that is a function of the difference between the sensed torque at the sensed temperature and the corresponding torque of the desired glass at the sensed temperature; and adjusting the flow rate of one of the glasses in response to said signal.

* * * * *